(12) United States Patent
Mikan et al.

(10) Patent No.: US 8,089,339 B2
(45) Date of Patent: Jan. 3, 2012

(54) WIRELESS DEVICE AS PROGRAMMABLE VEHICLE KEY

(75) Inventors: Jeffrey Mikan, Cumming, GA (US);
Justin McNamara, Atlanta, GA (US);
Fulvio Cenciarelli, Suwanee, GA (US);
Anastasios L. Kefalas, Alpharetta, GA (US); John E. Lewis, Lawrenceville, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 1412 days.

(21) Appl. No.: 11/614,434

(22) Filed: Dec. 21, 2006

(65) Prior Publication Data

US 2008/0150683 A1 Jun. 26, 2008

(51) Int. Cl.
*G05B 19/00* (2006.01)
*G05B 23/00* (2006.01)
*G06F 7/00* (2006.01)
(52) U.S. Cl. .......... 340/5.2; 340/5.1; 340/5.61; 235/384
(58) Field of Classification Search ............. 340/5.2, 340/5.61
See application file for complete search history.

(56) References Cited

U.S. PATENT DOCUMENTS

| 5,479,156 | A  | * | 12/1995 | Jones ........................ 340/5.64 |
| 5,705,991 | A  | * | 1/1998 | Kniffin et al. ............... 340/5.28 |
| 6,538,557 | B1 | * | 3/2003 | Giessl ......................... 340/5.2 |
| 6,987,964 | B2 | * | 1/2006 | Obradovich et al. ...... 455/414.1 |
| 7,319,848 | B2 | * | 1/2008 | Obradovich et al. .......... 455/99 |
| 7,518,489 | B2 | * | 4/2009 | Nelson et al. ............ 340/426.11 |
| 2002/0084887 | A1 | | 7/2002 | Arshad et al. ............... 340/5.61 |
| 2003/0126464 | A1 | * | 7/2003 | McDaniel et al. ............ 713/201 |
| 2005/0065682 | A1 | * | 3/2005 | Kapadia et al. ................ 701/35 |
| 2008/0150683 | A1 | * | 6/2008 | Mikan et al. .................. 340/5.31 |
| 2008/0301760 | A1 | * | 12/2008 | Lim ................................ 726/1 |

FOREIGN PATENT DOCUMENTS

| EP | 1 191 486 | 3/2002 |
| GB | 2 336 221 | 10/1999 |

* cited by examiner

*Primary Examiner* — Daniel Wu
*Assistant Examiner* — Frederick Ott
(74) *Attorney, Agent, or Firm* — Woodcock Washburn LLP (57) ABSTRACT

Methods and wireless devices for providing secure operation of a vehicle. In one such method, a key for accessing a vehicle is detected, a vehicle operation policy associated with the key is retrieved, and operation of the vehicle consistent with the vehicle operation policy is permitted. The key may be embedded within a wireless device such as a cellular telephone. The vehicle operation policy may include an access control rule that may indicate to enable, partially enable, or disable a vehicle operation feature. Where the intended operation of the vehicle is not consistent with the access control rule, the operation may not be permitted and an enforcement action may be taken, such as disabling a feature of the vehicle.

21 Claims, 8 Drawing Sheets

WIRELESS DEVICE AS PROGRAMMABLE VEHICLE KEY

BACKGROUND

Automobiles and other vehicles are often secured from unauthorized access and operation via lock and key. Once locked, the vehicle's doors and ignition system remain inoperable until the proper key is used. Keys traditionally have been made of metal blanks with grooves and teeth shaped to engage the lock. Electronic keys may provide similar functionality as their metal key counterparts. In addition, an electronic key may not require the operator of the vehicle to physically place the key within the lock. For example, the electronic key may operate via a proximity sensor within the car. When the electronic key is within range of the proximity sensor, the vehicle may shift from an inoperable, "locked" mode to an operable mode.

In addition to metal and electronic keys that grant full access to open and operate a vehicle, some vehicle manufactures provide a "valet key" that grants limited access to the vehicle. The valet key is typically a metal key that allows the holder to unlock the driver's side door and operate the ignition lock. The valet key typically does not provide access to the vehicle's trunk, glove box, or other secure areas of the vehicle. With respect to the operation of the vehicle, however, the valet key does not limit the range or manner in which the holder operates the vehicle. The holder of a valet key may operate the vehicle at any speed or over any distance, which may not be acceptable for the vehicle's owner.

Thus, when a vehicle owner wishes to allow another person (e.g., child, valet, friend, etc.) to operate the owner's vehicle, conventional metal and electronic keys typically provide the owner with only two options. The first option is to provide the person with a "regular" key that provides the person with full access to all of the vehicle's features. The second option is to provide the person with a valet key that restricts the person's access to certain vehicle compartments. In either case, the owner has no way to restrict the person's ability to operate the vehicle.

Wireless devices, such as cellular telephones, are increasingly ubiquitous. They are increasingly able to process applications and perform digital functions beyond placing and receiving telephone calls. Their network connectivity gives them functionality typically not found in other handheld devices.

SUMMARY

In view of the foregoing drawbacks and shortcomings, a method and device for providing secure operation of a vehicle is presented. The method includes detecting a key for accessing a vehicle, retrieving a vehicle operation policy associated with the key, and permitting operation of the vehicle consistent with the vehicle operation policy. The key may be embedded within a wireless device such as a cellular telephone. The vehicle operation policy may include an access control rule that may indicate to enable, partially enable, or disable a vehicle operation feature. Where the intended operation of the vehicle is not consistent with the access control rule, the operation may not be permitted and an enforcement action may be taken, such as disabling a feature of the vehicle for example.

Records in a first database may be synchronized with records in a second database. The second database may reside in a vehicle and the first database may communicate with the second database via a wireless network. The records may include an access control rule.

A wireless device for providing secure operation of a vehicle is also presented. The wireless device may include a user interface module, a wireless communications module, a memory, a processor, and a vehicle access module. The wireless communications module may communicate an request to update an access control rule via the wireless network. The vehicle access module may communicate a secure identifier to access the vehicle.

DETAILED DESCRIPTION

Example Network and Operating Environments

The following description sets forth some example telephony radio networks and non-limiting operating environments in which a wireless vehicle security system according to an embodiment may be used. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

Figure 1A:
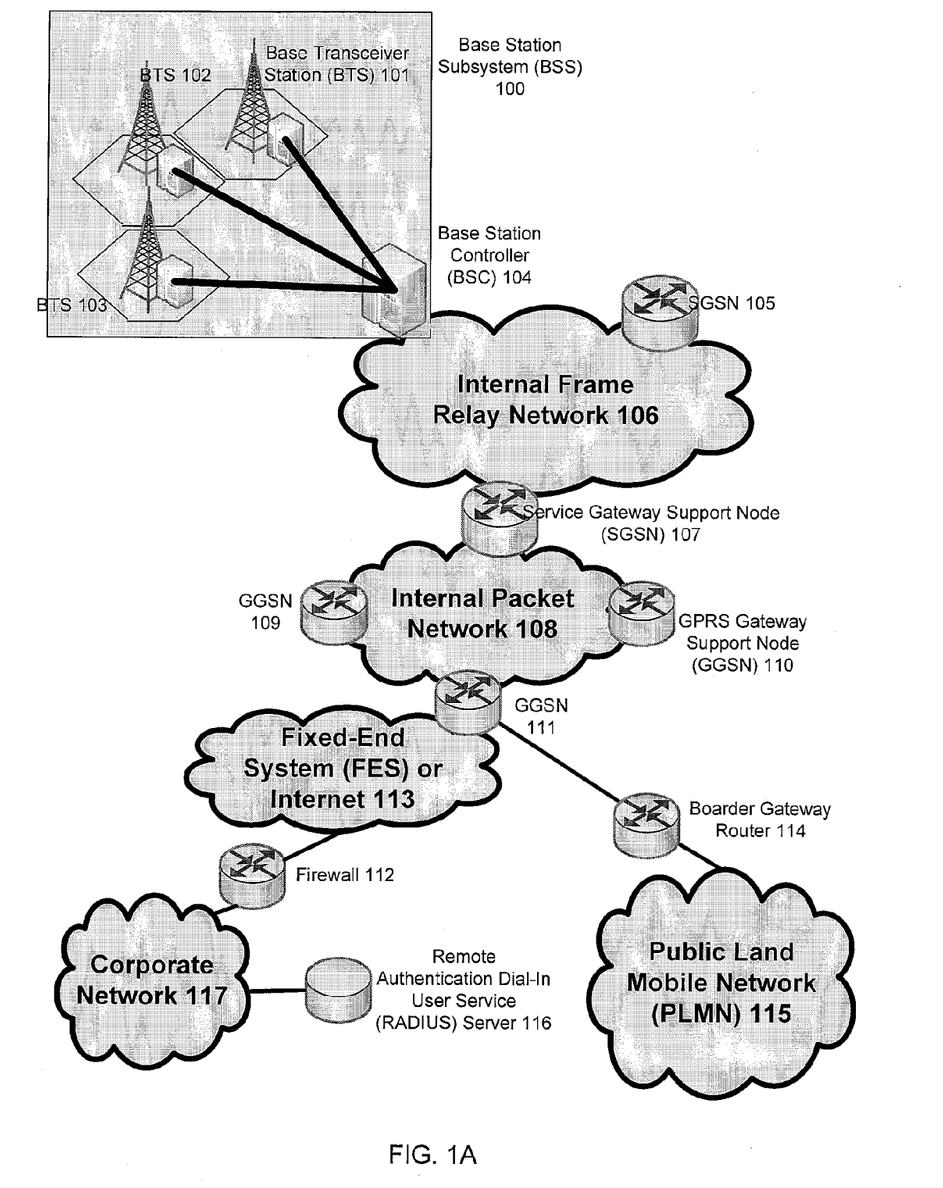
FIG. 1A depicts an overview of a network environment in which aspects of an embodiment may be implemented.

FIG. 1A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 100 (only one is shown in FIG. 1A), each of which comprises a Base Station Controller ("BSC") 104 serving a plurality of Base Transceiver Stations ("BTS") such as, for example, BTSs 101, 102 and 103. BTSs 101, 102, 103, etc., are the access points where users of packet-based mobile devices become connected to the wireless network. In one embodiment, the packet traffic originating from user devices is transported over the air interface to BTS 103, and from BTS 103 to BSC 104. Base station subsystems, such as BSS 100, may be a part of internal frame relay network 106 that may include Service GPRS Support Nodes ("SGSN") such as SGSN 105 and 107. Each SGSN 105, 107, etc. may be in turn connected to internal packet network 108 through which SGSN 105, 107, etc. can route data packets to and from a plurality of gateway GPRS support nodes (GGSN) 222, 111, 110, etc. As illustrated, SGSN 107 and GGSNs 222, 111 and 110 are part of internal packet network 108. Gateway GPRS serving nodes 222, 111 and 110 may provide an interface to external Internet Protocol ("IP") networks such as Public Land Mobile Network ("PLMN") 115, corporate intranets 117, Fixed-End System ("FES"), the public Internet 113 or the like. As illustrated, subscriber corporate network 117 may be connected to GGSN 111 via firewall 112; and PLMN 115 may be connected to GGSN 111 via boarder gateway router 114. Remote Authentication Dial-In User Service ("RADIUS") server 116 may be used for caller authentication when a user of a mobile cellular device calls corporate network 117, for example.

Generally, there can be four different cell sizes in a GSM network—macro, micro, pico and umbrella cells. The coverage area of each cell is different in different environments. Macro cells may be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Figure 1B:
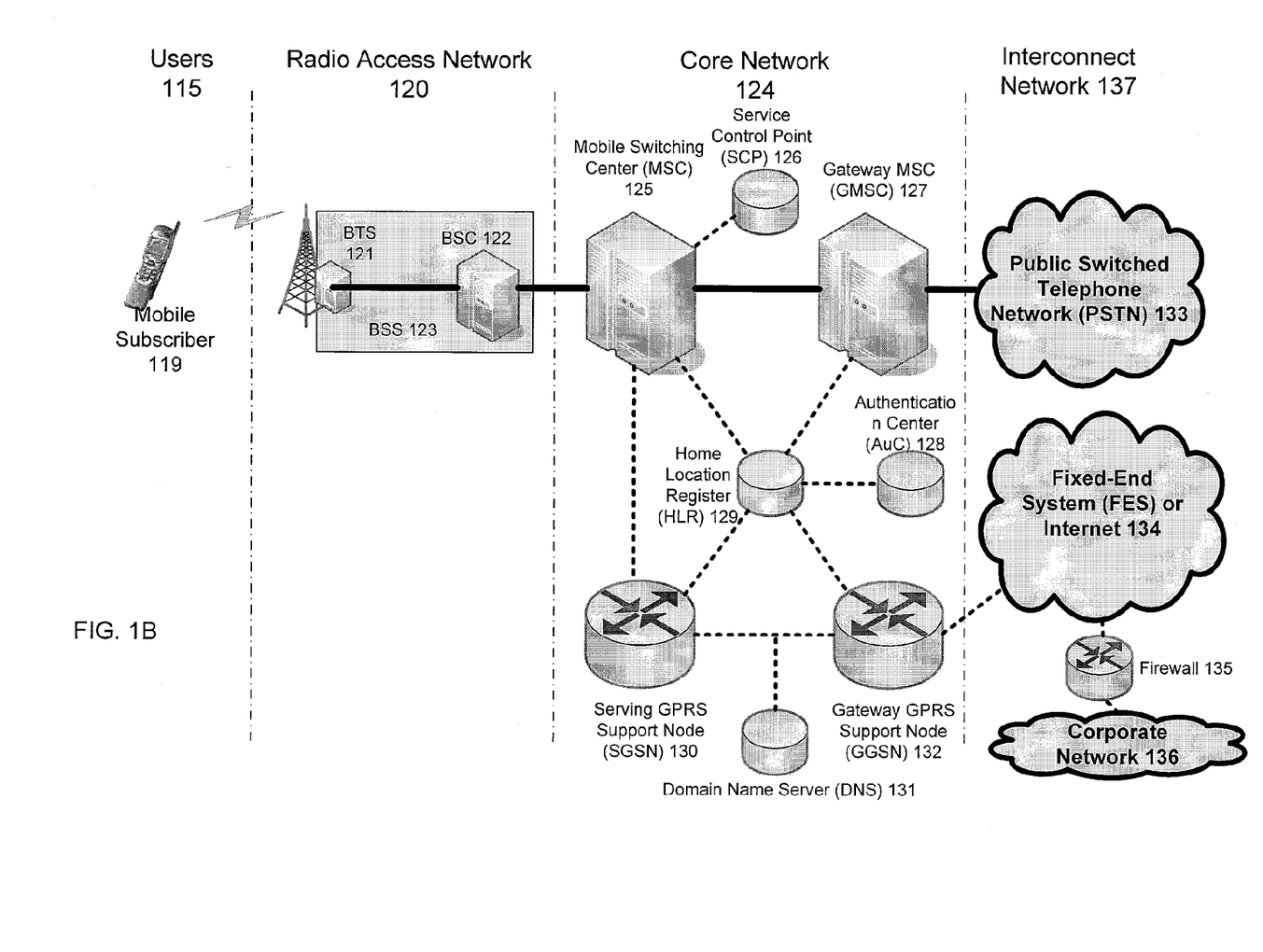
FIG. 1B depicts a GPRS network architecture in which aspects of an embodiment may be implemented.

FIG. 1B illustrates the architecture of a typical GPRS network as segmented into four groups: users 115, radio access network 120, core network 124 and interconnect network 137. Users 115 comprise a plurality of end users. Radio access network 120 comprises a plurality of base station subsystems such as BSSs 123, which include BTSs 121 and BSCs 122. Core network 124 comprises a host of various network elements. As illustrated here, core network 124 may comprise Mobile Switching Center ("MSC") 125, Service Control Point ("SCP") 126, gateway MSC 127, SGSN 130, Home Location Register ("HLR") 129, Authentication Center ("AuC") 128, Domain Name Server ("DNS") 131 and GGSN 132. Interconnect network 137 also comprises a host of various networks and other network elements. As illustrated in FIG. 1B, interconnect network 137 comprises Public Switched Telephone Network ("PSTN") 133, Fixed-End System ("FES") or Internet 134, firewall 135 and Corporate Network 136.

A mobile switching center 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to SGSN 130, which then sends the data traffic to GGSN 132 for further forwarding.

When MSC 125 receives call traffic, for example, from BSC 122, it may send a query to a database hosted by SCP 126. The SCP 126 processes the request and issues a response to MSC 125 so that it may continue call processing as appropriate.

HLR 129 is a centralized database for users to register to the GPRS network. HLR 129 stores static information about the subscribers such as the International Mobile Subscriber Identity ("IMSI"), subscribed services, and a key for authenticating the subscriber. HLR 129 also stores dynamic subscriber information such as the current location of the mobile subscriber. Associated with HLR 129 may be AuC 128. AuC 128 is a database that contains the algorithms for authenticating subscribers and includes the associated keys for encryption to safeguard the user input for authentication.

In the following, depending on context, the term "mobile subscriber" may refer to either the end user or to the actual portable device used by an end user of the mobile cellular service. When a mobile subscriber turns on his or her mobile device, the mobile device goes through an attach process by which the mobile device attaches to an SGSN of the GPRS network. Referring now to FIG. 1B, when mobile subscriber 119 initiates the attach process by turning on the network capabilities of the mobile device, an attach request is sent by mobile subscriber 119 to SGSN 130. The SGSN 130 queries another SGSN, to which mobile subscriber 119 was attached before, for the identity of mobile subscriber 119. Upon receiving the identity of mobile subscriber 119 from the other SGSN, SGSN 130 requests more information from mobile subscriber 119. This information is used to authenticate mobile subscriber 119 to SGSN 130 by HLR 129. Once verified, SGSN 130 sends a location update to HLR 129 indicating the change of location to a new SGSN, in this case SGSN 130. HLR 129 notifies the old SGSN, to which mobile subscriber 119 was attached, to cancel the location process for mobile subscriber 119. HLR 129 then notifies SGSN 130 that the location update has been performed. At this time, SGSN 130 sends an Attach Accept message to mobile subscriber 119, which in turn sends an Attach Complete message to SGSN 130.

After attaching itself with the network, mobile subscriber 119 then goes through the authentication process. In the authentication process, SGSN 130 sends the authentication information to HLR 129, which sends information back to SGSN 130 based on the user profile that was part of the user's initial setup. SGSN 130 then sends a request for authentication and ciphering to mobile subscriber 119. Mobile subscriber 119 uses an algorithm to send the user identification (ID) and password to SGSN 130. SGSN 130 uses the same algorithm and compares the result. If a match occurs, SGSN 130 authenticates mobile subscriber 119.

Next, mobile subscriber 119 establishes a user session with the destination network, corporate network 136, by going through a Packet Data Protocol ("PDP") activation process. Briefly, in the process, mobile subscriber 119 requests access to the Access Point Name ("APN"), for example, UPS.com (e.g., which can be corporate network 279) and SGSN 130 receives the activation request from mobile subscriber 119. SGSN 130 then initiates a Domain Name Service ("DNS") query to learn which GGSN node has access to the UPS.com APN. The DNS query is sent to the DNS server within the core network 124, such as DNS 131, which is provisioned to map to one or more GGSN nodes in the core network 124. Based on the APN, the mapped GGSN 132 can access the requested corporate network 279. The SGSN 130 then sends to GGSN 132 a Create Packet Data Protocol ("PDP") Context Request message that contains necessary information. The GGSN 132 sends a Create PDP Context Response message to SGSN 130, which then sends an Activate PDP Context Accept message to mobile subscriber 119.

Once activated, data packets of the call made by mobile subscriber 119 can then go through radio access network 120, core network 124, and interconnect network 137, in particular fixed-end system or Internet 134 and firewall 135, to reach corporate network 136.

Thus, network elements that may implicate the functionality of the service delivery based on real-time performance requirement(s) in accordance with an embodiment may include but are not limited to Gateway GPRS Support Node tables, Fixed End System router tables, firewall systems, VPN tunnels and any number of other network elements as required by the particular digital network.

Figure 1C:
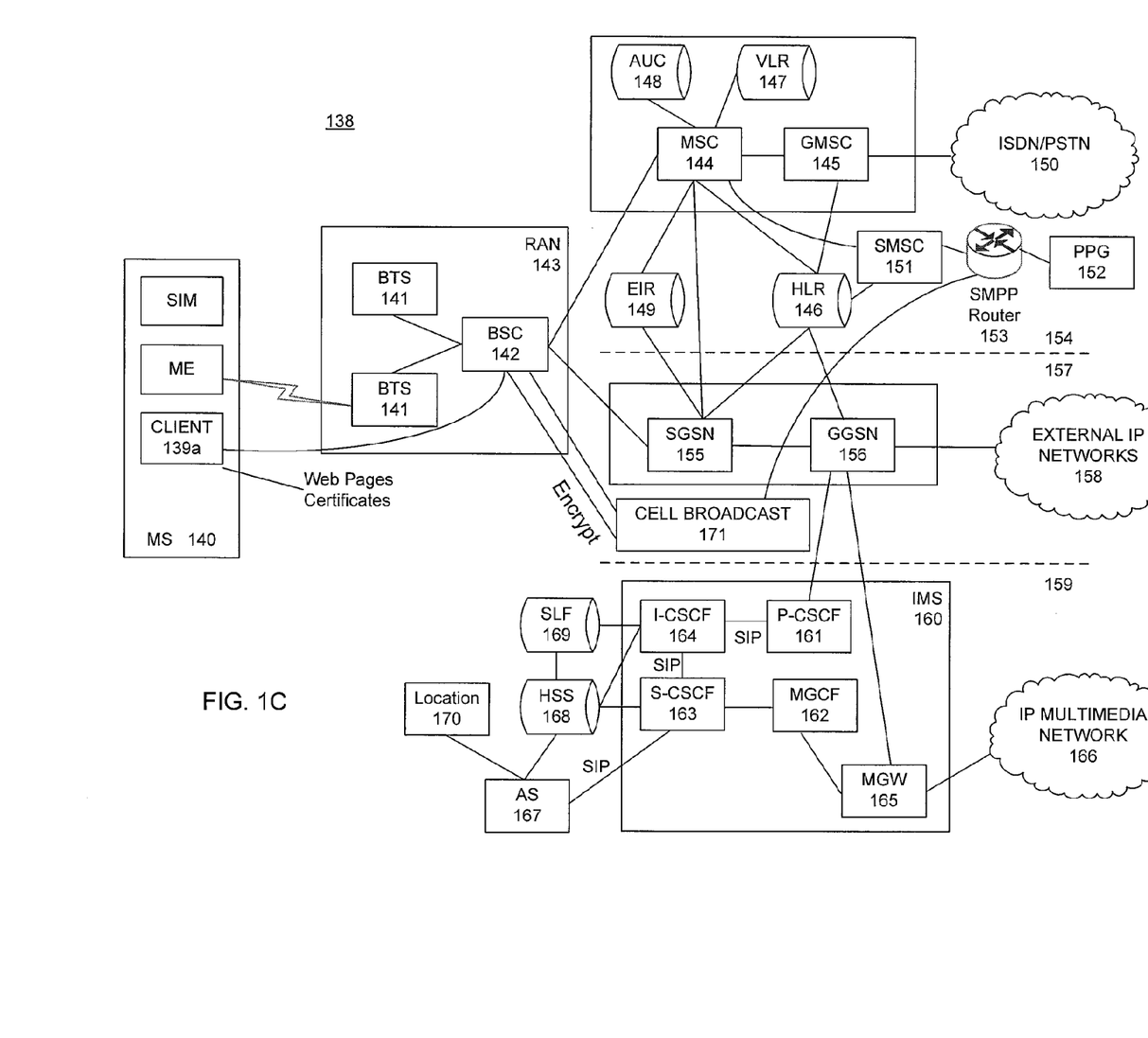
FIG. 1C depicts an alternate block diagram of an example GSM/GPRS/IP multimedia network architecture in which aspects of an embodiment may be implemented.

FIG. 1C shows another example block diagram view of a GSM/GPRS/IP multimedia network architecture 138 in which the apparatus and methods for transferring multimedia content between receiving devices of the below-discussed embodiments may be incorporated. As illustrated, architecture 138 of FIG. 1C includes GSM core network 154, GPRS network 157 and IP multimedia network 159. GSM core network 154 includes Mobile Station (MS) 140, at least one Base Transceiver Station (BTS) 141 and Base Station Controller (BSC) 142. MS 140 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. BTS 141 is physical equipment, such as a radio tower, that enables a radio interface to communicate with the MS. Each BTS may serve more than one MS. BSC 142 manages radio resources, including the BTS. The BSC may be connected to several BTSs. The BSC and BTS components, in combination, are generally referred to as a base station (BSS) or radio access network (RAN) 143.

GSM core network 154 also includes Mobile Switching Center (MSC) 144, Gateway Mobile Switching Center (GMSC) 145, Home Location Register (HLR) 146, Visitor Location Register (VLR) 147, Authentication Center (AuC) 149 and Equipment Identity Register (EIR) 148. MSC 144 performs a switching function for the network. The MSC also performs other functions, such as registration, authentication, location updating, handovers and call routing. GMSC 145 provides a gateway between the GSM network and other networks, such as an Integrated Services Digital Network (ISDN) or Public Switched Telephone Networks (PSTNs) 150. In other words, GMSC 145 provides interworking functionality with external networks.

HLR 146 is a database that contains administrative information regarding each subscriber registered in a corresponding GSM network. HLR 146 also contains the current location of each MS. VLR 147 is a database that contains selected administrative information from HLR 146. The VLR contains information necessary for call control and provision of subscribed services for each MS currently located in a geographical area controlled by the VLR. HLR 146 and VLR 147, together with MSC 144, provide the call routing and roaming capabilities of GSM. AuC 148 provides the parameters needed for authentication and encryption functions. Such parameters allow verification of a subscriber's identity. EIR 149 stores security-sensitive information about the mobile equipment.

Short Message Service Center (SMSC) 151 allows one-to-one Short Message Service (SMS) messages to be sent to/from MS 140. Push Proxy Gateway (PPG) 152 is used to "push" (i.e., send without a synchronous request) content to MS 102. PPG 152 acts as a proxy between wired and wireless networks to facilitate pushing of data to MS 140. Short Message Peer to Peer (SMPP) protocol router 153 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. MS 140 sends a location update including its current location information to the MSC/VLR, via BTS 141 and BSC 142. The location information is then sent to the MS's HLR. The HLR is updated with the location information received from the MSC/VLR. The location update also is performed when the MS moves to a new location area. Typically, the location update is periodically performed to update the database as location updating events occur.

GPRS network 157 is logically implemented on the GSM core network architecture by introducing two packet-switching network nodes, a serving GPRS support node (SGSN) 155 and a cell broadcast and a Gateway GPRS support node (GGSN) 156. SGSN 155 is at the same hierarchical level as MSC 144 in the GSM network. The SGSN controls the connection between the GPRS network and MS 140. The SGSN also keeps track of individual MS's locations and security functions and access controls.

Cell Broadcast Center (CBC) 171 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

GGSN 156 provides a gateway between the GPRS network and a public packet network (PDN) or other IP networks 158. That is, the GGSN provides interworking functionality with external networks, and sets up a logical link to the MS through the SGSN. When packet-switched data leaves the GPRS network, it is transferred to external TCP-IP network 158, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 157 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

IP multimedia network 159 was introduced with 3GPP Release 5, and includes IP multimedia subsystem (IMS) 160 to provide rich multimedia services to end users. A representative set of the network entities within IMS 160 are a call/session control function (CSCF), media gateway control function (MGCF) 162, media gateway (MGW) 165, and a master subscriber database, referred to as a home subscriber server (HSS) 168. HSS 168 may be common to GSM network 154, GPRS network 157 as well as IP multimedia network 159.

IP multimedia system 160 is built around the call/session control function, of which there are three types: interrogating CSCF (I-CSCF) 164, proxy CSCF (P-CSCF) 161 and serving CSCF (S-CSCF) 163. P-CSCF 161 is the MS's first point of contact with IMS 160. P-CSCF 161 forwards session initiation protocol (SIP) messages received from the MS to an SIP server in a home network (and vice versa) of the MS. P-CSCF 161 may also modify an outgoing request according to a set of rules defined by the network operator (for example, address analysis and potential modification).

I-CSCF 164 forms an entrance to a home network and hides the inner topology of the home network from other networks and provides flexibility for selecting an S-CSCF. I-CSCF 164 may contact subscriber location function (SLF) 169 to determine which HSS 168 to use for the particular subscriber, if multiple HSSs 168 are present. S-CSCF 163 performs the session control services for MS 140. This includes routing originating sessions to external networks and routing terminating sessions to visited networks. S-CSCF 163 also decides whether application server (AS) 167 is required to receive information on an incoming SIP session request to ensure appropriate service handling. This decision is based on information received from HSS 168 (or other sources, such as application server 167). AS 167 also communicates to location server 170 (e.g., a Gateway Mobile Location Center (GMLC)) that provides a position (e.g., latitude/longitude coordinates) of MS 140.

HSS 168 contains a subscriber profile and keeps track of which core network node is currently handling the subscriber. It also supports subscriber authentication and authorization functions (AAA). In networks with more than one HSS 168, a subscriber location function provides information on HSS 168 that contains the profile of a given subscriber.

The MGCF 162 provides interworking functionality between SIP session control signaling from IMS 160 and ISUP/BICC call control signaling from the external GSTN networks (not shown). It also controls media gateway (MGW) 165 that provides user-plane interworking functionality (e.g., converting between AMR- and PCM-coded voice). MGW 165 also communicates with other IP multimedia networks 166.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

Example Embodiments

Figure 2:
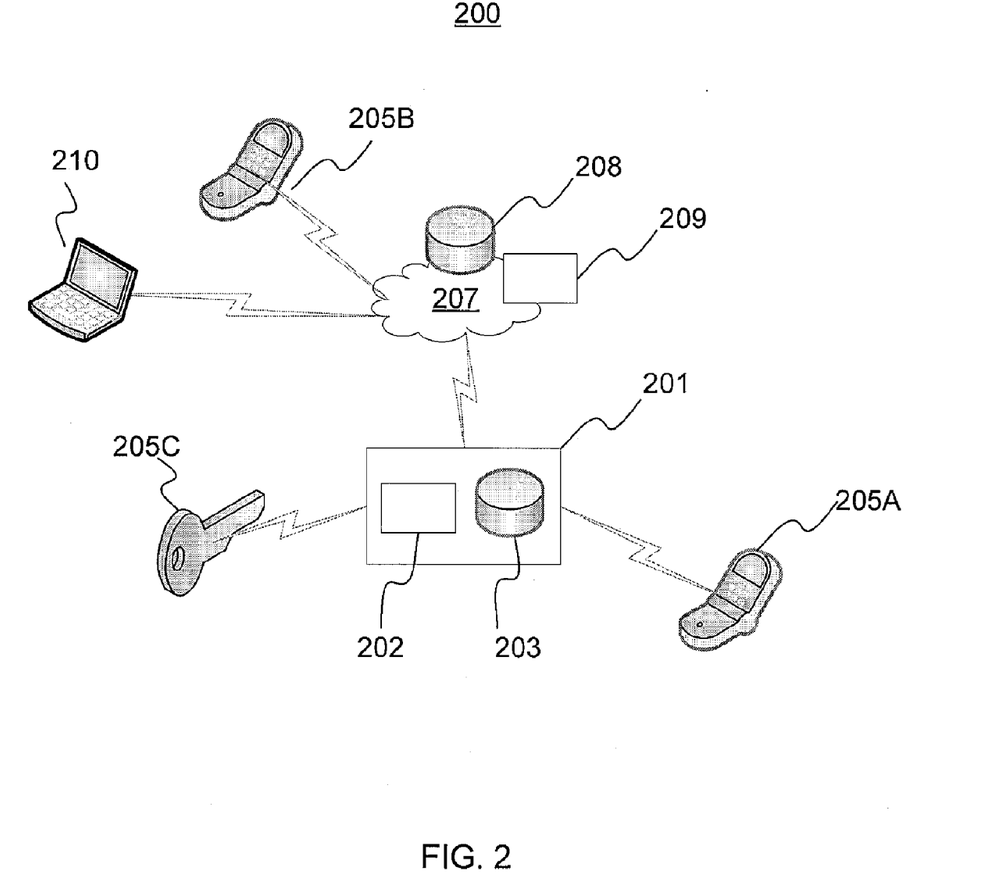
FIG. 2 depicts a block diagram of an example wireless vehicle security system.

FIG. 2 illustrates a block diagram of an example wireless vehicle security system 200. Wireless vehicle security system 200 may secure access and operation of vehicle 201. Vehicle 201 may be a car, truck, boat, motorcycle or other mechanism for transporting people or things. Vehicle 201 may support various vehicle operation features such as unlocking a door, opening a trunk, opening a glove box, engaging an ignition, directing the vehicle from a one geographic location to a another geographic location, and accelerating the vehicle, for example. Any aspect of the control, use, or functionality of vehicle 201 may be considered a vehicle operation feature.

The system may include one or more keys 205A-C control unit 202 and local database 203, for example. Keys 205A-C may be electronic keys, traditional metal keys, or a combination of both. In one embodiment, keys 205A-C may be embedded in a wireless device such as a cellular telephone or Personal Digital Assistant (PDA), for example.

Control unit 202 may be any combination of hardware and/or software that is in operative communication with vehicle 201 and keys 205A-C. For example, the control unit may be an onboard computer. In one embodiment, key 205A-C may communicate directly with control unit 202. For example, key 205A-C and control unit 202 may communicate directly via a radio frequency transmission. In another embodiment, vehicle 201 may communicate to control unit 202 when key 205A-C is inserted into a key slot of vehicle 201. Control unit 202 may be in operative communication with local database 203. In one embodiment, control unit 202 and local database 203 may be resident within vehicle 201. Local database 203 may be any software system or device suitable for storing and retrieving data records. In one embodiment, local database 203 may be a Structured Query Language (SQL)-compliant database, for example. In another embodiment, local database 203 may be implemented as a relational database, hierarchical database, or the like. Local database 203 may include any number of records, where each record represents a vehicle operation policy. The vehicle operation policy may relate to vehicle operation features and keys 205A-C.

Control unit 202 may be in communication with wireless network 207. Wireless network 207 may be any system suitable for wirelessly sending and receiving data. Wireless network 207 may be a GSM network, a GPRS network, an EDGE network, Wideband Integrated Dispatch Enhanced Network (WiDEN), Wideband Code Division Multiple Access (W-CDMA) network, Wireless Local Area Network (WLAN), or a 802.11a/b/g/n network, for example. In one embodiment, wireless network 207 may host master database 208 and application 209. Wireless network 207 may interconnect with other networks, such as corporate extranets, private networks, the Internet, or the public switched telephone network (PSTN), for example.

Control unit 202 may interface with vehicle 201. Control unit 202 may control vehicle functions and may sense operation of vehicle 201. For example, control unit 202 may signal to lock and unlock the vehicle doors. For example, control unit 202 may sense vehicle speed and the status of the ignition. Control unit 202 may interface to a Global Positioning System (GPS) unit to sense the position of vehicle 201. In one embodiment, any aspect of the vehicle operation that may be controlled by an electrical signal may be controlled by control unit 202, and aspect of the vehicle operation that may be sensed and converted to an electronic signal may be sensed by control unit 202.

Master database 208 may be any software system or device suitable for storing and retrieving data records. For example, master database 208 may be a Structured Query Language (SQL)-compliant database. Master database 208 may include any number of records representing a vehicle operation policy, and master database 208 may include any number of vehicle operation policies relating to more than one vehicle. Master database 208 may communicate with local database 203. In one embodiment, local database 203 may mirror some of the data in master database 208 such that records within each database are consistent. For example, local database 203 may regularly poll master database 208 to maintain consistent data. In one embodiment, each of local database 203 and master database 208 may communicate an update to the other after a record change.

Master application 209 may be any interface, software, or device suitable for managing communication to and from master database 208. For example, master application 209 may be software resident on a server platform, may be integrated into master database 208, may stand alone, etc. In one embodiment, master application 209 may include a hypertext transfer protocol (HTTP) server.

Key 205B and computer 210 may be in communication with wireless network 207. In one embodiment, key 205B and computer 210 may communicate with application 209, with master database 208, or, via wireless network 207, with control unit 202 and/or local database 203. Both computer 210 and key 205B may provide a user interface with wireless vehicle security system 200 to enable a user to manage and monitor system 200. For example, where key 205B is part of a mobile telephone, the user of the mobile telephone may use the mobile telephone to send updates to master database 208 via master application 209.

Figure 3A:
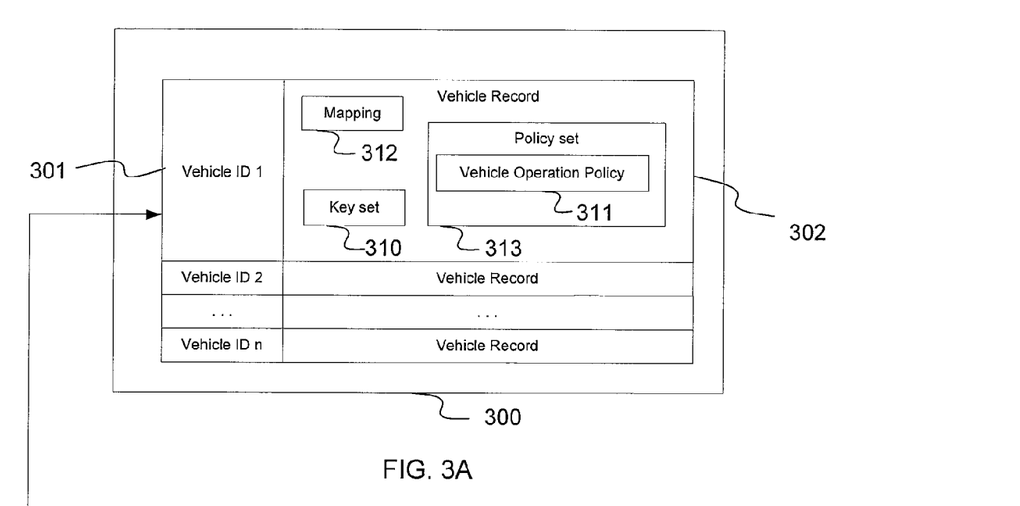
FIGS. 3A-B depicts a block diagram of an example master database and local database, respectively.
Figure 3B:
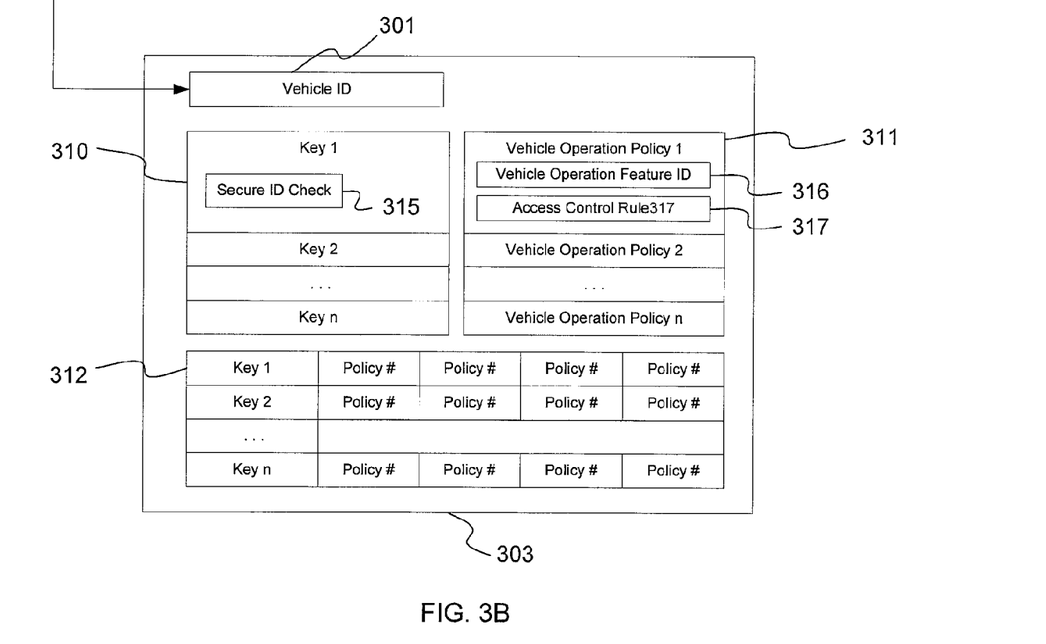

FIGS. 3A-B illustrate a block diagram of an example structure for master database 300 and local database 303, respectively. It will be appreciated that FIGS. 3A-B depict just one possible embodiment; master database 300 and local database 303 may be structured in accordance with other database schema. An embodiment of the master database 208 is depicted in FIG. 3 as master database 300. Similarly, an embodiment of the local database 203 is depicted in FIG. 3 as local database 303.

Master database 300 may include any number of vehicle records 302. Each record may be associated with Vehicle ID 301. Vehicle ID 301 may be an identifier that uniquely defines a vehicle record 302. For example, vehicle ID 301 may be a vehicle identification number (VIN), serial number, an alphanumeric string, or the like. Vehicle ID 301 may relate to a physical vehicle that may be within wireless vehicle security system 200. In one embodiment, vehicle record 302 may include key set 310, policy set 313, and mapping 312. Key set 310 may include data representing a collection of keys 205A-C. Policy set 313 may include a collection of vehicle operation policies 311. Mapping 312 may include a collection of one or more relationships linking individual keys from key set 310 with individual vehicle operation policies from policy set 313. In one embodiment, there may be a one-to-one relationship between vehicle ID 301 and vehicle record 302. Mapping 312 may include a one-to-many relationship between an individual key of key set 310 and vehicle operation policies 311. It will be appreciated that other schema may be used to practice master database 300.

Local database 303 may include vehicle ID 301, key set 310, one or more vehicle operation policies, and mapping 312. Vehicle ID 301 in local database 303 may map directly to that in master database 300. In one embodiment, vehicle ID 301 in local database 303 may be a singular record that associates particular vehicle ID 301 with physical vehicle 201. Key set 310 may include a secure ID check 315 associated with a key 205A-C within the set. The secure ID check may be a serial number, electronic serial number (ESN), or other identifier of a key 205A-C. In one embodiment, secure ID check 315 may be a digital signature associated with a key 205A-C. For example, the digital signature may be the product of a public key encryption system. In another embodiment, the secure ID check may be a component of a challenge and response system such as the challenge-handshake authentication protocol (CHAP), for example.

Local database 303 may include vehicle operation policy 311. Vehicle operation policy 311 may include vehicle operation feature ID 316 and a related access control rule 317. Vehicle operation feature ID 316 may be, for example, a data field identifying one vehicle operation feature. Vehicle 201 may support various vehicle operation features such as unlocking a door, opening a trunk, opening a glove box, engaging an ignition, directing the vehicle from a one geographic location to another geographic location and accelerating the vehicle, for example. Any aspect of the control, use, or functionality of vehicle 201 may be considered a vehicle operation feature. It will be appreciated that one or more vehicle subsystems that control one or more of such vehicle operation features may be in operative communication with, for example, wireless vehicle security system 200 (not shown in FIGS. 3A-B). A vehicle operation feature may be associated with vehicle operation feature ID 316. Access control rule 317 may include a criterion relating to associated vehicle operation feature ID 316. For example, access control rule 317 may operate to enable, partially enable, or disable the related vehicle operation feature. Access control rule 317 may include advanced criteria relating to the manner and conditions under which the vehicle may be operated. For example, access control rule 317 may establish a maximum acceleration for the vehicle, a maximum distance traveled for the vehicle, a range of time within which the vehicle may be operated, a geographic range within which the vehicle may be operated and the like. For illustration, access control rule 317 may indicate that the vehicle's ignition may not be engaged between 12 a.m. and 5 a.m., or it may indicate that the vehicle may not be operated above 65 miles per hour. For example, access control rule 317 may relate to the number of people in the car. Weight sensors within the seat may be used to determine the number of people in the car, for example. For example, access control rule 317 may relate to the distance between vehicle 201 and key 205A-C. For illustration, wireless network 207 may send the position of a key embedded within a cellular phone, and using an GPS, control unit 202 may determine the distance between the cellular phone and vehicle 201.

Mapping 312 may link vehicle operation policy 311 and keys 205A-C. To illustrate this point, one embodiment may include two keys, first with greater access than the second. The first key, in this example illustration, may be related via mapping 312 to access control rule 317 that enables all vehicle operation features. The second key, in this illustration, may be a "valet key" with limited functionality. For example, the second key may be related to three access control rules 317: a first rule that disables access to the trunk and glove box, a second rule that limits the maximum speed to 35 miles per hour, and a third rule that limits the total allowed distance traveled to one mile.

Figure 4:
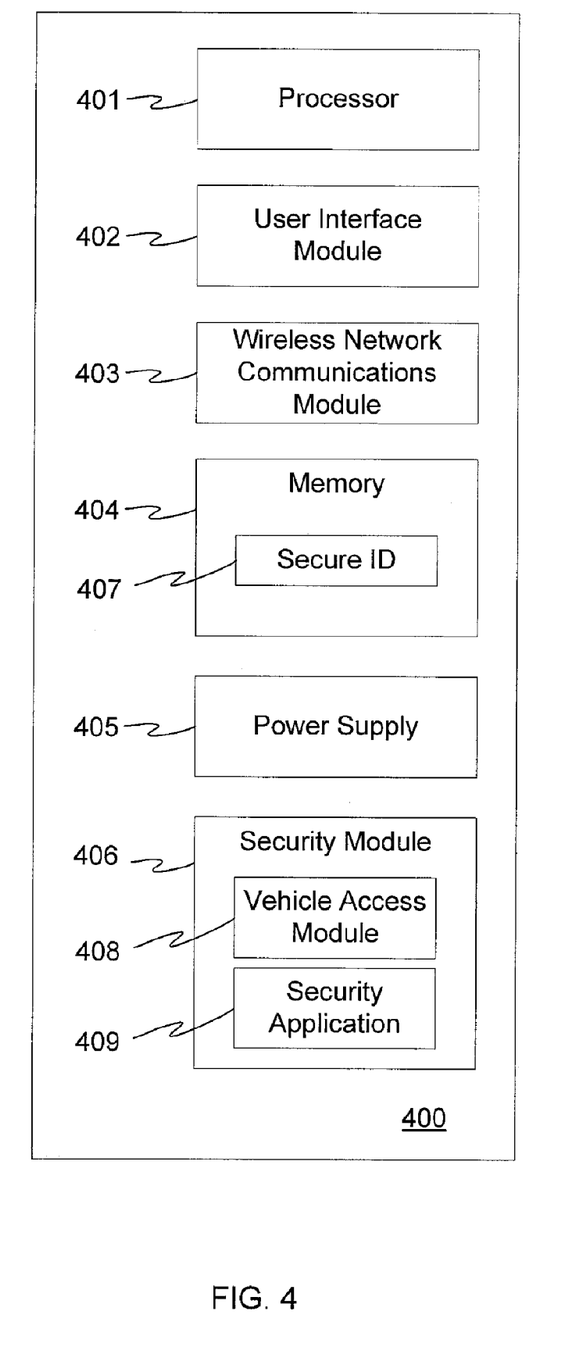
FIG. 4 depicts a block diagram of an example wireless device equipped for use as an electronic key.

FIG. 4 illustrates a block diagram of an example wireless device 400 equipped for use as a key 205A-C within wireless vehicle security system 200. Wireless device 400 may include processor 401, user interface module 402, wireless communications module 403, memory 404, power supply 405, and security module 406, for example. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

User interface module 402 may include a display for illustrating textual and graphical information to a user and a collection of keys, buttons, or voice controls for receiving input from the user. For example, the buttons or keys may relate to fixed, pre-defined functions (hard keys), or they may have dynamically defined or context controlled functions (soft keys). User interface module 402 may be enabled receive user requests from the user, such as an update request and an access request, for example. The update request may include access control rule 317 from the user. User interface module 402 may be enabled to receive access control rule 317 from the user, and it may be enabled to display access control rule 317 to the user. In an embodiment, the access request access may relate to a vehicle operation feature. In addition, and in an embodiment, the user interface module 402 may include a hard key related to unlocking a vehicle door.

Wireless communications module 403 may be a subsystem suitable to provide communications between wireless device 400 and wireless network 207. Wireless communications module 403 may include a modulator, a transmitter, a receiver and an antenna, for example. In one embodiment, wireless communications module 403 may enable communication over a GSM or GPRS network for example. Wireless communications module 403 may communicate the update request via wireless network 207. Wireless communications module 403 may support telephony and data services.

Memory 404 may be a subsystem suitable for storing and retrieving data. Memory 404 may be random access memory (RAM) or read only memory (ROM), or the like. In one embodiment, memory 404 may provide non-volatile storage of secure identifier 407 of wireless device 400. In another embodiment, memory 404 may provide volatile storage of secure identifier 407 retrieved, for example, via wireless communications module 403 or via user interface module 402 with a user/password prompt, biometric or other user authentication. In one embodiment, secure identifier 407 may authenticate wireless device 400 as a key 205A-B as discussed above in connection with FIG. 2. Secure identifier 407 may be a serial number, electronic serial number (ESN), or other identifier of wireless device 400. In one embodiment, secure identifier 407 may be a digital signature associated with wireless device 400. The digital signature may, for example, be the product of a public key encryption system. In another embodiment, secure identifier 407 may be a component of a challenge and response system, such as the challenge-handshake authentication protocol (CHAP).

Processor 401 may be a microprocessor packaged in one or more integrated circuits with support circuitry. Processor 401 may be structured as a reduced instruction set computer (RISC), an advanced RISC machine (ARM) and/or as a gate-level logic circuit, for example. Processor 401 may include an array processor and/or a digital signal processor (DSP), for example. Processor 401 may be in communication with user interface module 402, wireless communications module 403, memory 404, power supply 405, and security module 400. In one embodiment, processor 401 may operate responsive to user input, such as a user request, for example. Thus, and responsive to a user request, processor 401 may retrieve secure identifier 407 from memory 404, and may perform one or more operations on secure identifier 407. Processor 401 may also operate responsive to instructions from security application 409.

Security module 406 may include security application 409 and vehicle access module 408. Vehicle access module 408 may receive secure identifier 407 from processor 401, and may communicate with vehicle 201 to send secure identifier 407 to vehicle 201. Vehicle access module 408 may communicate via any wireless protocol suitable for the transmission of data. For example, access module 408 may communicate via Bluetooth protocol, WiFi, RF-ID, cellular, and the like. Bluetooth protocol may be defined by the Institute of Electrical and Electronics Engineers (IEEE) specification 802.15.1. Security application 409 may include software relating to the management of secure identifiers 407. In one embodiment, security application 409 may provide a user with customizable features that may be presented by user interface module 402. Security application 409 may perform cryptographic functions related to the secure identifier, an authentication process, or cryptographic key generation, for example.

Figure 5:
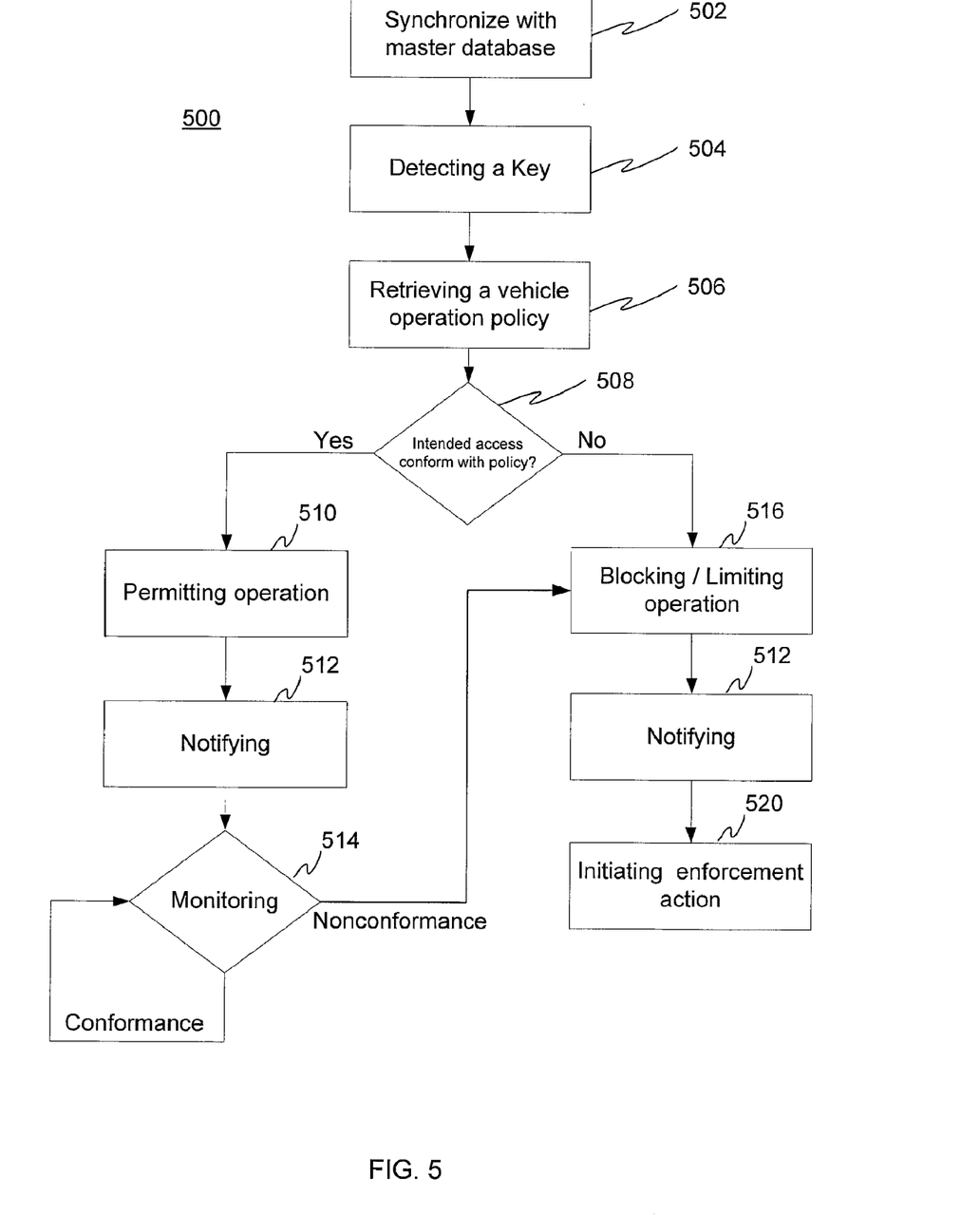
FIG. 5 depicts a flow diagram of an example vehicle security process.

FIG. 5 depicts a flow diagram of example vehicle security process 500. Example process 500 is merely one embodiment and therefore describes features and functionality by way of example and illustration. Reference will also be made to FIGS. 2, 3A-B, and 4 where appropriate.

At 502 local database 203 may synchronize with master database 208. Control unit 202 or local database 203 may initiate the synchronization to pull updated data from master database 208. Alternatively, master application 209 or master database 208 may initiate the synchronization to push updated data to local database 203. The synchronization may be a partial or complete refresh of the data. For example, the updated data may represent only the changes in the master database made since the last synchronization in a partial refresh. In a complete refresh, the updated data may represent the entire contents of master database 208 that are relevant to vehicle 201. To balance design concerns of data integrity and bandwidth usage, periodic complete refreshes may be supplemented by intermediate partial refreshes.

At 504, a user attempt to access or operate vehicle 201 with a key 205A-C is detected, which may initiate the authentication the detection of key 205A-C may include receiving secure identifier 407. Secure identifier 407 may be received, for example, at control unit 202. Where key 205A-C is an electronic key, such as a key embedded in wireless device 400 for example, key 205A-C may transmit secure identifier 407. Where key 205A-C is a metal key for insertion into a physical lock, the physical lock may authenticate the key—by the patterns of grooves and teeth, for example—and signal a secure identifier within vehicle 201 to control unit 202.

Control unit 202 may authenticate key 205A-C via secure ID check 315. For example, where the secure ID is a serial number the secure ID check may be a copy of the serial number. For security, the control unit and key 205A-C may determine the secure ID from a common hopping code or rolling code, where the secure ID changes after each use. The authentication may include verifying a digital signature and timestamp, for example.

At 506 vehicle operation policy 311 may be retrieved by, for example, querying local database 203. In one embodiment, the query may be based on authenticated key 205A-C. The records queried reflect the vehicle operation policy 311 that may be in effect with relation to the key 205A-C being used. More than one vehicle operation policy 311 record may be returned as a result of the query. In one embodiment, control unit 202 may perform the query and may temporarily store or cache the records for the duration of the users operation of the vehicle 201.

Vehicle 201 may receive a user request, such as an access request for example. The access request may include unlocking a door, opening a trunk, opening a glove box, engaging an ignition, directing the vehicle from a first geographic location to a second geographic location, and accelerating the vehicle, for example. To illustrate, the user may approach the vehicle 201, signal the secure ID 407 and an access request to unlock a vehicle door. To illustrate, the user may be operating the vehicle and press the accelerator of the vehicle, signaling an access request to accelerate the vehicle.

At 508, control unit 202 may process the access request and compare the access request with retrieved vehicle operation policy 311. Where the access request is consistent with retrieved vehicle operation policy 311, control unit 202 may permit the operation of the vehicle at 510. Where the access request is inconsistent with the with the retrieved vehicle operation policy 311, then at 516 control unit 202 may block and/or limit the operation of the vehicle.

At 512, the control unite 202 may notify a user or a system by signaling an indication of whether an access request conformed with the retrieved vehicle operation policy 311. In one embodiment, the notification need not occur, particularly if the access did conform with the retrieved vehicle operation policy 311. Notification may occur whether or not the access request was permitted or blocked. The nature and extent of the notification may depend on the significance of the access request or related vehicle operation policy 311. The notification may be an electronic message, an audible alarm and/or a visual alarm, for example. The electronic message may be any digital communication such as e-mail, a database query or update, a text message via Short Message Service (SMS), and/or appending a text string to a log file, for example. The electronic message may be sent via wireless network 207 to wireless device 400, computer 210, or other device reachable by network 207. The audible alarm may be within vehicle 201, at wireless device 400. The visual alarm may be within vehicle 201, such as a dash board indicator light for example, at a wireless device 400, or displayed on the screen of a computer. The notification may be directed or redirected to the police or other security officers.

At 514, the control unit 202 may monitor the status of a particular vehicle operation feature and confirming its conformance with vehicle operation policy 311 associated with the key 205A-C that is currently in use. Once control unit 202 has permitted a vehicle operation feature, monitoring ensures that the feature stays in conformance with policy 311. For example, where vehicle operation policy 311 includes setting a maximum speed for the operation of vehicle 201, monitoring continuously checks the speed of vehicle 201 and compares it to the maximum imposed by vehicle operation policy 311. If vehicle 201's speed exceeds that defined by policy 311, notification and/or enforcement action may be taken.

At 516, the control unit 202 may block and/or limit operation of vehicle 201 may occur when an access request does not conform with vehicle operation policy 311 or may occur when a vehicle operation feature being monitored no longer conforms with vehicle operation policy 311. In such a situation, and in one embodiment, control unit 202 may disallow the operation. For example, where key 205A-C signals an access request to vehicle 201 to unlock a door and the access request is not allowed by vehicle operation policy 311 retrieved for that specific key 205A-C, blocking operation may include maintaining the locked condition of the doors, or if the doors were previously unlocked, blocking may include locking the doors.

In addition to limiting or blocking, control unit 202 may, at 520, initiate an enforcement action when an access request does not conform with vehicle operation policy 311 or when a vehicle operation feature being monitored no longer conforms with vehicle operation policy 311. An enforcement action may include sending an electronic message, sounding an audible alarm, illuminating a visual alarm, gradually lowering a maximum speed of the vehicle, disabling an audio system of the vehicle, and the like. In one embodiment, where the enforcement action is directed to bringing the vehicle to a stop, control unit 202 may direct vehicle 201 to gradually lower the maximum speed while indicating to the driver that vehicle 201 soon will be inoperable. In another embodiment, where vehicle 201 may be in operation late in the evening outside of a defined time range, the enforcement action may disable the audio system and/or other comfort features of the vehicle.

Figure 6:
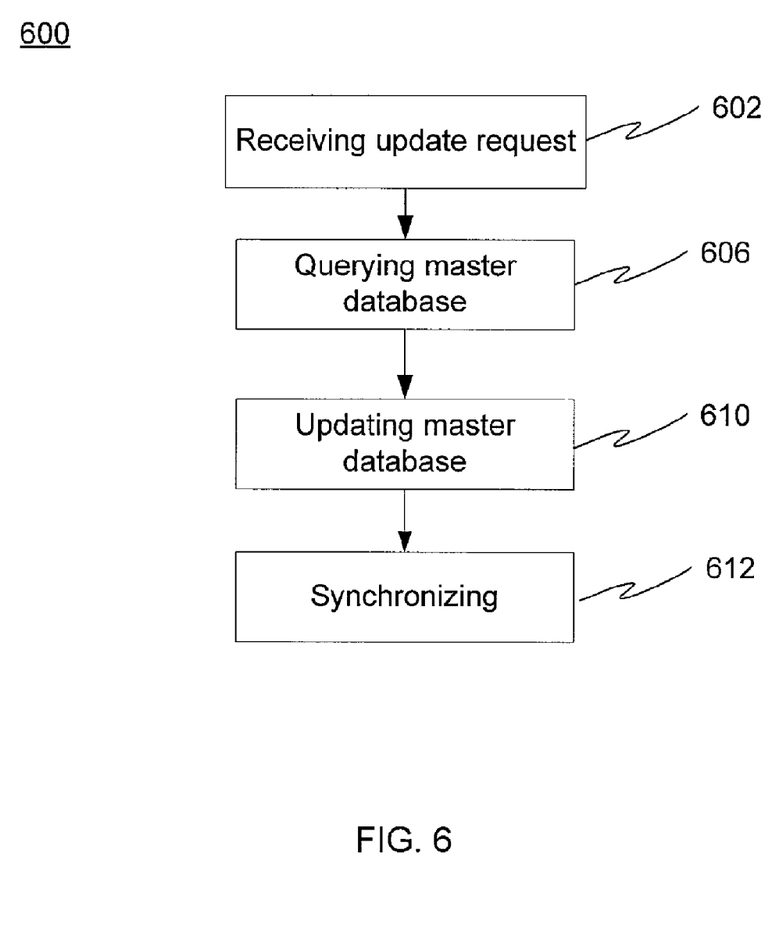
FIG. 6 depicts a flow diagram of an example network security process.

FIG. 6 depicts a flow diagram of an example network security process 600. Example process 600 is merely an embodiment and describes features and functionality by way of example and illustration. In one embodiment, network security process 600 may be implemented by a combination of wireless network 207, master database 208 and master application 209. Network security process 600 may, for example, handle messages and logic related to the overall management of wireless vehicle security system 200.

In one embodiment, at 602 mater application 209 may receive an update request. The update request may have originated at a computing device such as a wireless telephone, a computer 210, a wireless handheld device, a server, control unit 202, key 205B, or any other device capable of formulating and sending a message via wireless network 207. The update request may include, but is not limited to, a vehicle identifier, a secure key identifier, and a access control rule, for example. The update request may be formatted in any acceptable computer readable format such as an HTTP message, an SMS message, a protocol related to a downloadable web application (Java and/or ActiveX, for example), a SQL formatted query, and the like.

At 606, master database 208 may be queried. This may include a request for information from master database 208 via a database query. In one embodiment, the query may include a vehicle identifier to filter only records relating to a particular vehicle. The query may be generated via master application 209, computer 210, or other device that may be in operative communication with wireless network 207. The query may retrieve and return query results, which may include information such as, for example, a vehicle record, key set 310, vehicle operation policy 311, mapping 312 and the like. In one embodiment, the query results may support a display application at computer 210 for providing a user with a current view of the keys 205A-C and policies related to a vehicle. In one embodiment, the query may return results to an application that may process the results. Master application 209 processing an update request may query 606 master database 208 to locate the records related to the update request. Master application 209 may extract the vehicle identifier from the update request and populate a field of the query with the vehicle identifier.

Master application 209 may consider the query results in processing an update request. For example, master application 209 may compare the secure identifier of the update request with the key set retrieved via the query to authenticate the update request. Master application 209 may compare the access control rule of the update request with that contained in vehicle operation policy 311 retrieved via the query. On this basis, master application 209 may reject the update request, defer the update request, or continue to process the update request.

At 610, master database 208 may be updated with data to supersede or supplement one or more existing records. Master application 209 may update master database 208 responsive to a properly authenticated update request. The updating may include editing or overwriting one or more records, deleting one or more records, or adding one or more records, for example. Where master application 209 receives an access control rule in the update request, updating may include making the records in master database 208 reflect the received access control rule.

At 612, local database 203 and master database 208 may synchronize. This may include sending or receiving data that, when processed by either local database 203 and/or master database 208, make the records in each consistent with each other. In one embodiment, consistency may be achieved by making the data of local database 203 mirror that of corresponding vehicle record 302. Master database 208 may push data to local database 203, or local database 203 may pull data from master database 208 or some combination thereof. In one embodiment, master database 208 may push data to synchronize after every update request. Master database 208 may maintain an accounting of the changes made to vehicle record 302 since the last synchronization and include that data when synchronizing with local database 203. In one embodiment, local database 203 may request a complete refresh, where the entire record is synchronized. This approach may be desirable when some or all data of local database 203 has become corrupted or lost.

In one embodiment, the synchronization data may be communicated via wireless network 207. Vehicle 201 may not always be in contact with wireless network 207, such as when vehicle 201 is parked underground and out of range of wireless network 207, for example. Where master database 208 pushes the synchronization to local database 203, master application 209 may establish communication with control unit 202 before initiating the synchronization. When communication cannot be established, master application 209 or master database 208 may queue the request for a later time.

What is claimed:

1. A method for providing secure operation of a vehicle comprising:
    detecting a key for accessing a vehicle;
    retrieving a vehicle operation policy from a first database, where the vehicle operation policy is associated with the key, such that the vehicle operation policy identifies an access control rule to be enforced when the key is detected, wherein the access control rule is associated with vehicle operation features comprising unlocking a door, opening a trunk, opening a glove box, engaging an ignition, directing the vehicle from a first geographic location to a second geographic location, and accelerating the vehicle;
    permitting operation of the vehicle consistent with the vehicle operation policy;
    wherein said detecting comprises receiving a secure key identifier from a wireless device; and
        wherein the secure identifier comprises an encrypted digital signature.

2. The method of claim 1, wherein the key is embedded in a wireless device in communication with the vehicle.

3. The method of claim 2, wherein the wireless device is a cellular telephone.

4. The method of claim 3, further comprising synchronizing information stored in the first database with information stored in a second database via the cellular telephone.

5. The method of claim 3, wherein the access control rule indicates that the vehicle operation feature is any one of enabled, partially enabled, or disabled.

6. The method of claim 1, wherein the access control rule sets any one of: a maximum speed for the vehicle, a maximum acceleration for the vehicle, a maximum distance traveled for the vehicle, a range of time within which the vehicle may be operated, and a geographic range within which the vehicle may be operated.

7. The method of claim 1, further comprising initiating an enforcement action, wherein the enforcement action comprises any one of: sending an electronic message, sounding an audible alarm, illuminating a visual alarm, gradually lowering a maximum speed of the vehicle, and disabling an audio system of the vehicle.

8. The method of claim 1, further comprising sending a notification message, wherein the notification message is any one of the following: an electronic message, an audible alarm, and a visual alarm.

9. The method of claim 1 further comprising synchronizing information stored in the first database with information stored in a second database.

10. The method of claim 9, wherein said synchronizing comprises receiving at the first database an update from the second database.

11. The method of claim 9, wherein said synchronizing comprises sending a vehicle identifier to the second database and receiving an update from the second database.

12. A method for providing secure operation of a vehicle, the method comprising:
    receiving a request to update a first database from a computing device, wherein the request comprises a vehicle identifier, a secure key identifier associated with a key, and an access control rule to be enforced when the key is detected, wherein the access control rule is associated with vehicle operation features comprising unlocking a door, opening a trunk, opening a glove box, engaging an ignition, directing the vehicle from a first geographic location to a second geographic location, and accelerating the vehicle;

querying a first database to locate a first record, that is associated with the vehicle identifier;

updating the first record to reflect the access control rule; and synchronizing the first record with a corresponding second record in a second database.

13. The method of claim 12, wherein the computing device is a wireless device, and wherein said receiving the request comprises receiving the request via a wireless network.

14. The method of claim 12, wherein the access control rule indicates that the vehicle operation feature is any one of: enabled, partially enabled, or disabled.

15. The method of claim 12, wherein the access control rule sets any one of: a maximum speed for the vehicle, a maximum acceleration for the vehicle, a maximum distance traveled for the vehicle, a range of time within which the vehicle may be operated, and a geographic range within which the vehicle may be operated.

16. The method of claim 12, wherein the second database resides within a vehicle, and synchronizing the first record with a corresponding second record in the local database comprises communicating between the first database and the vehicle via a wireless data network.

17. A wireless device for providing secure operation of a vehicle comprising:

a user interface module that receives a first request to gain access to a vehicle and that receives a second request to update an access control rule, wherein the access control rule is associated with vehicle operation features comprising unlocking a door, opening a trunk, opening a glove box, engaging an ignition, directing the vehicle from a first geographic location to a second geographic location, and accelerating the vehicle;

a memory that stores a secure identifier of the wireless device;

a processor that retrieves the secure identifier from the memory in response to the first request, when the first request is consistent with an access control rule to be enforced when a key is detected;

a vehicle access module that sends the secure identifier to the vehicle; and a wireless communications module that sends the second request.

18. The wireless device of claim 17, wherein the wireless communications module send the second request via a wireless network.

19. The wireless device of claim 17, wherein the vehicle access module communicates via Bluetooth protocol.

20. The wireless device of claim 17, wherein the communications module is enabled to communicate over a global system for mobile communication network.

21. The wireless device of claim 17 wherein the communications module is enabled to communicate over a general packet radio service network.

* * * * *